United States Patent [19]
Young

[11] Patent Number: 5,588,251
[45] Date of Patent: Dec. 31, 1996

[54] DEVICE FOR THE PREVENTION OF COLLISIONS OF BIRDS WITH TRANSPARENT BARRIERS

[76] Inventor: Sam W. Young, 1203 White Rd., Opelika, Ala. 36801

[21] Appl. No.: 386,446

[22] Filed: Feb. 10, 1995

[51] Int. Cl.⁶ .................................................. H01M 29/00
[52] U.S. Cl. .................. 43/119; 52/101; 428/16; 428/79; D20/11
[58] Field of Search ............................ 43/119; D11/133, D11/134, 157, 158; D20/11; 52/101; 428/79, 16, 13; 40/299

[56] References Cited

U.S. PATENT DOCUMENTS

| | | | |
|---|---|---|---|
| 2,603,485 | 7/1952 | Countryman | 43/119 |
| 4,359,844 | 11/1982 | Hoggard et al. | 52/101 |
| 4,736,907 | 4/1988 | Steffen | 244/1 R |
| 5,167,099 | 12/1992 | Nelson | 52/101 |
| 5,253,444 | 10/1993 | Donoho et al. | 43/1 |
| 5,291,707 | 3/1994 | McDonald | 52/244 |
| 5,299,528 | 4/1994 | Blankenship | 119/26 |

FOREIGN PATENT DOCUMENTS

| | | | |
|---|---|---|---|
| 4-229124 | 8/1992 | Japan | 52/101 |
| 6-181672 | 7/1994 | Japan | 52/101 |

OTHER PUBLICATIONS

*National Wildlife*, "Spiders Advertise: To Protect Their Webs", vol. 21, p. 30 Apr.–May 1983.
American Spiders, 2nd Ed., Willis J. Gertsch, Von Nostrand Reinhold, 1979, Plate XVI.
Spider–Web Protection Through Visual Advertisement: Role of the Stabilimentum, T. Eisner and S. Nowicki, Science, 14 Jan. 1983.

*Primary Examiner*—Jeanne M. Elpel

[57] ABSTRACT

A passive method for protecting flying birds against the danger of colliding into transparent barriers is disclosed. The method involves placing on the transparent barrier an image of the center portion of the web of an orb web building spider especially including in the image an adornment on the web known as the stabilimentum. The stabilimentum is known to be an advertisement by the spider for the purpose of deterring birds from flying into the web, an event which both animals wish to avoid. When the spider web image is placed on the transparent barrier, flying birds will take evasive action and thus avoid harmful collisions. Since the spider web image is mostly transparent, it does not block out a large portion of the transparent barrier.

10 Claims, 4 Drawing Sheets

5,588,251

DEVICE FOR THE PREVENTION OF COLLISIONS OF BIRDS WITH TRANSPARENT BARRIERS

BACKGROUND

1. Field of Invention

This invention elates generally to the petection of flying birds by preventing them from colliding with a transparent barrier. Such prevention method will keep the barrier substantially unaffected.

2. Prior Art

Present day building design practices call for the use of many glass windows and doors in our homes, schools, office buildings and other structures. These transparent windows and doors present a serious hazard to flying birds who by nature are not prepared to perceive the presence of such barriers. The problem is most acute in an area where a bird is able to see through a structure. Such condition would occur, for example, in the case of a corridor with facing exterior glass walls or in the case of a corner room of a building with glass windows on two sides. In sympathy with the birds who are injured or killed by these collisions, one would like to make it possible for the flying bird to avoid the transparent barrier by its own inherent instincts. At the same time, the glass windows and doors of our buildings serve an aesthetic and functional purpose and one would like to leave them as unaffected as possible.

Numerous devices are designed for the purpose of preventing birds from perching in certain places such as the ledges of buildings and window sills. Some such devices employ sharp spikes or elaborate ornaments to make the environment unsuitable and perhaps even dangerous for the presence of the bird. For example, U.S. Pat. No. 5,253,444 to Donoho et al. (1993). Other devices are designed for the purpose of preventing collisions between birds and flying aircraft. For example, U.S. Pat. No. 4,736,907 to Steffen (1988). These devices and methods all employ a means of scaring the birds away from the area of roosting and gathering. All of the inventions of these two categories just mentioned are not designed primarily for the protection of the bird and do not apply in any practical way to the problem addressed herein.

There are existing methods for protecting birds from other types of dangers. Devices have been designed to prevent a bird from electrocution when it lands on the crossbar of a power pole. See U.S. Pat. No. 4,359,844 to Hoggard et al. (1982) and U.S. Pat. No. 5,299,528 to Blankenship (1994). Also, an apparatus has been designed to protect birds by means of a physical barrier from the danger of alighting on a gas flue stack or from nesting inside the stack. See U.S. Pat. No. 5,291,707 to McDonald (1994). Such inventions which are intended to protect birds from particular types of dangers are hardly applicable to the case of transparent barriers. Nelson, U.S. Pat. No. 5,167,099 (1992), shows a device for deterring birds from nesting or roosting on an upwardly facing horizontal surface consisting of strings held in place by brackets. Nelson would not apply to the problem of transparent barriers since it would not apply to vertical barriers which are inherently the subject of the present invention. Numerous devices exist which are designed to scare birds with the image of a predator or the eyes of a predator and such. See JP 4-229,124 and JP 6-181,672. Such devices do not have a lasting effect as the wild birds tend to become complacent about the object over time (example: the familiar picture of the crow roosting on the scarecrow). It is also not clear how a scaring device such as these can be utilized to divert a bird in the dynamic circumstance of flying toward a transparent barrier. In any case, the present invention is far less elaborate and almost certainly more effective than the inventions cited.

Countryman, U.S. Pat. No. 2,603,485 teaches placing an image of a spider web on a window. The Countryman invention is intended as an amusing decoration and does not include the stabilimentum which is added to the web of certain spiders for the purpose of protecting the web from collisions by birds. It has been shown that even real webs which do not have the stabilimentum will not enjoy the same protection (Eisner and Nowicki). In any case, Countryman does not anticipate and does not teach that a spider web containing a stabilimentum placed on a transparent barrier will accomplish the purpose of the present invention.

There exists therefore a need for a simple, passive and inexpensive method for deflecting flying birds from the unique danger of collision with barriers which are invisible to the bird. It should be easy to install, unobtrusive and effective.

3. Objective

The principle objective of the present invention is to provide a method for causing a bird which is flying toward a transparent barrier—a danger unperceived by the bird—to think that it is flying toward a spider web—a danger which is perceived by the bird.

A further objective of the invention is to accomplish the principle objective, just stated, while interfering as little as possible with the function of the transparent barrier.

SUMMARY OF THE INVENTION

Many species of orb web building spiders add to the center of the web a zig-zag pattern of bright white silk called the stabilimentum—so called since it was once generally thought that the function of it was to stabilize the web. This conspicuous adornment, however, is now thought by scientists to be a protective device that warns birds of the presence of webs in their flight path. The spider benefits from the arrangement by avoiding having its web torn by birds while the bird benefits by avoiding the contamination of its feathers by the sticky threads of the web. Evidence to support this hypothesis is obtained by observing that the webs which have had the stabilimentum removed are much more likely to be destroyed by bird collisions than are undisturbed webs. Furthermore, birds have been observed in the field taking evasive action to avoid webs which have stabilimenta. See Spider-Web Protection Through Visual Advertisement: Role of the Stabilimentum by T. Eisner and S. Nowicki, Science, 14 January, 1983. Eisner and Nowicki p 185 shows photographs of various types of stabilimenta as well as false man-made stabilimenta. Also see National Wildlife, "Spiders Advertise to Protect Their Webs", V21, page 20, for another brief discussion of the essential discoveries of Eisner and Nowicki and another photograph of an orb web adorned with a stabilimentum.

The golden garden spider, *Argiope aurantia*, serves as a good model to illustrate the effectiveness of the invention, The genus Argiope is found throughout the world with the most common species of the Americas being *Argiope aurantia*. The female of this large spider builds a web as much as two feet in diameter. These webs can be commonly found in gardens and around houses. The stabilimentum at the center of the web is an advertisement to birds to stay away and millions of years of coevolution between birds and spiders guarantees that the message will get across.

Therefore, the above objectives are achieved by attaching to a transparent barrier a visible object which looks like the center of an orb spider web containing a stabilimentum at its radial center, and thus causing a flying bird to think that it is flying toward a large spider web and take evasive action. By the phrase "center of the web" or "center portion of the web" we mean a convex region of the web which contains the radial center, is large enough to contain a stabilimentum located at the radial center and is at least six inches in diameter.

Further objects and advantages of my invention will be apparent from the drawings and ensuing description.

THE DRAWINGS

Figure 3:
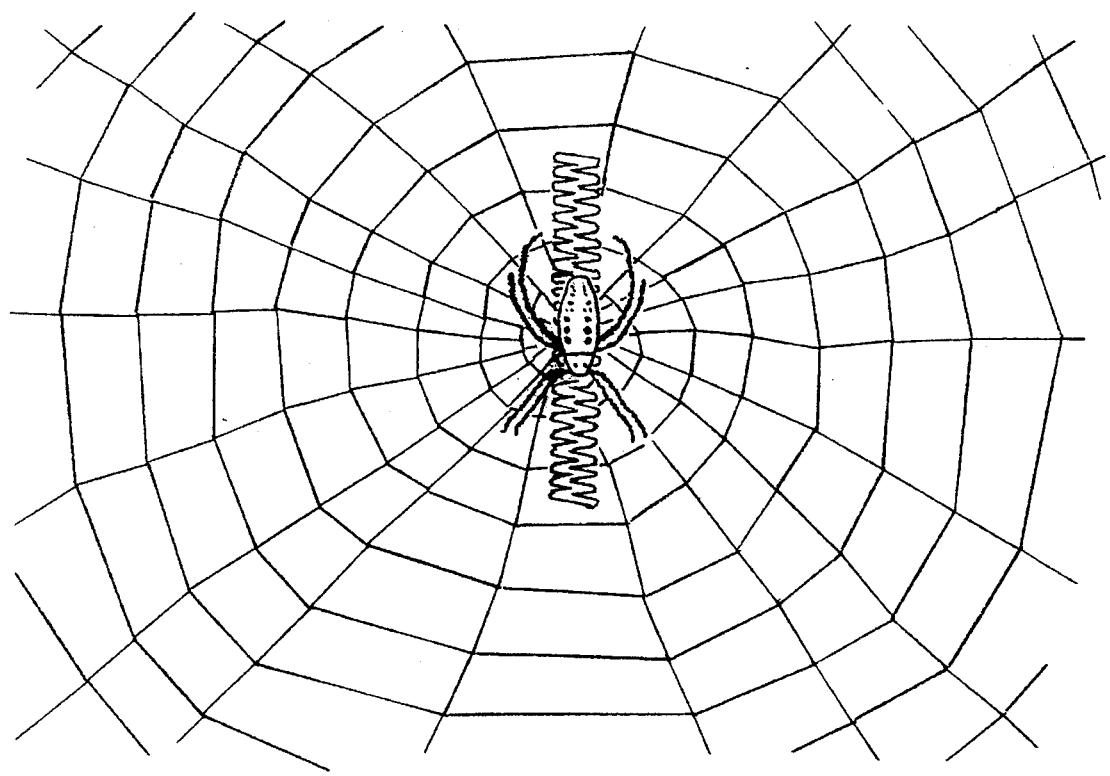
Figure 4:
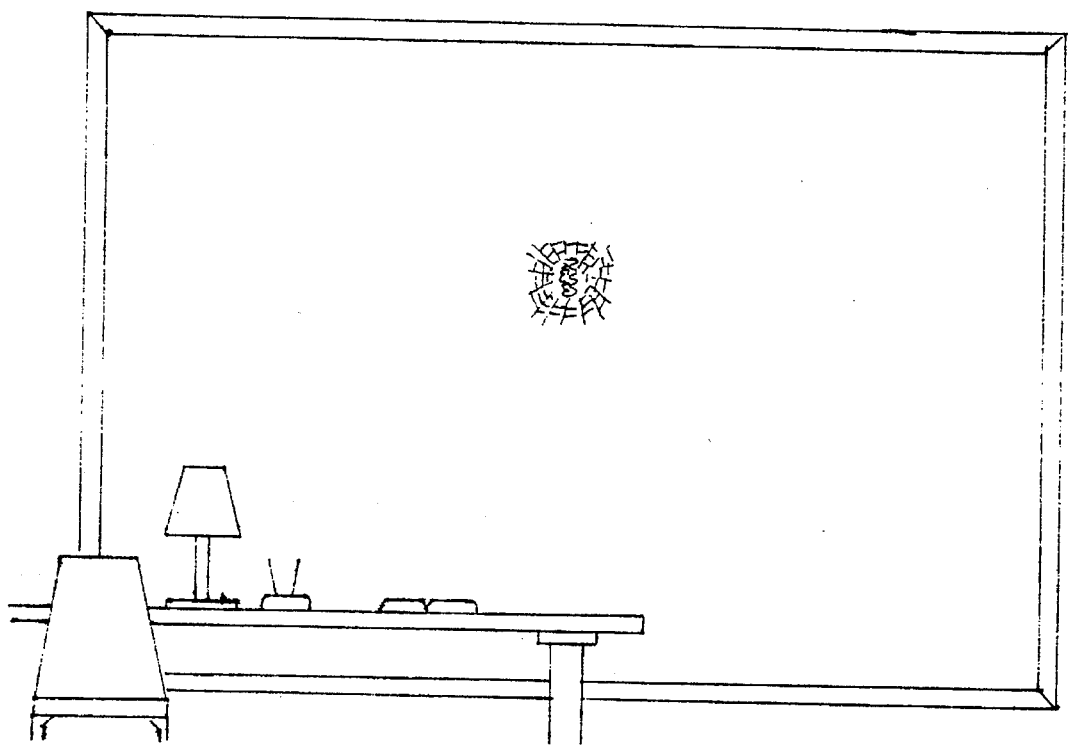

FIG. 3 shows the center portion of a typical orb spider web including a vertical style stabilimentum and a spider. See American Spiders, 2nd ed., Willis J. Gertsch, Von Nostrand Reinhold, 1979. And;

FIG. 4 illustrates how the spider web figures can be used with respect to transparent barriers to deter flying birds from colliding with such barriers. An image like that of FIG. 1 has been placed on the glass window of an office building.

BEST MODE FOR CARRYING OUT THE INVENTION

Figure 1:
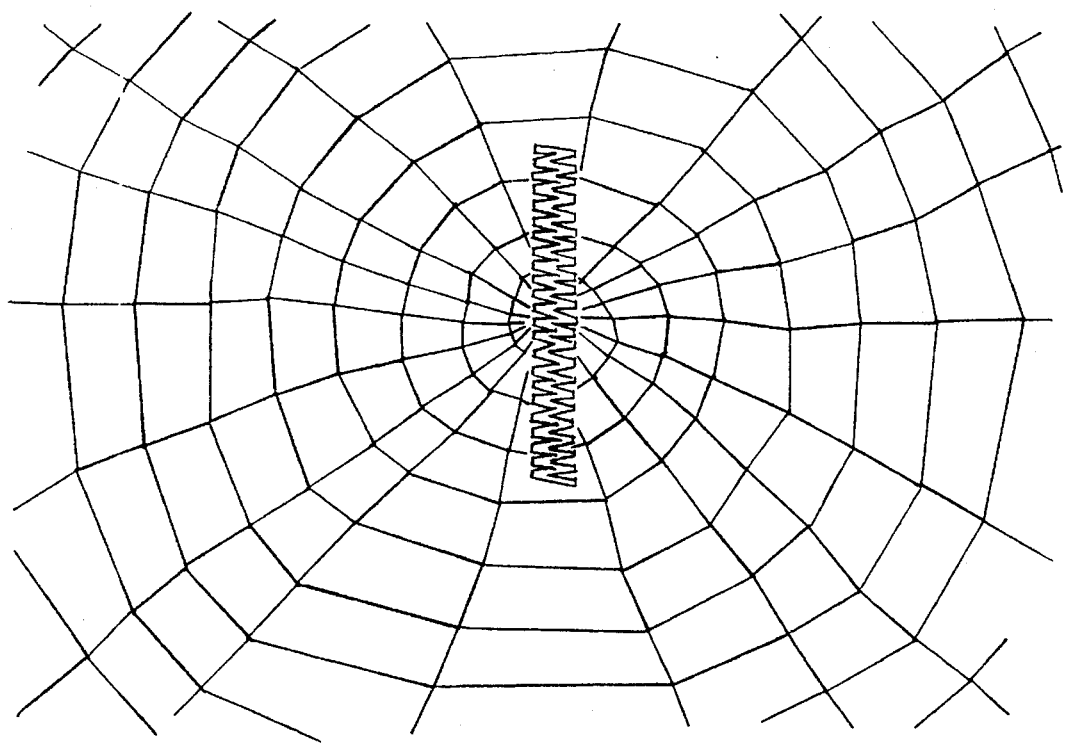
FIG. 1 shows the center portion of a typical orb spider web including a vertical style stabilimentum. For scale, the life size length of the stabilimentum should be approximately four inches.
Figure 2:
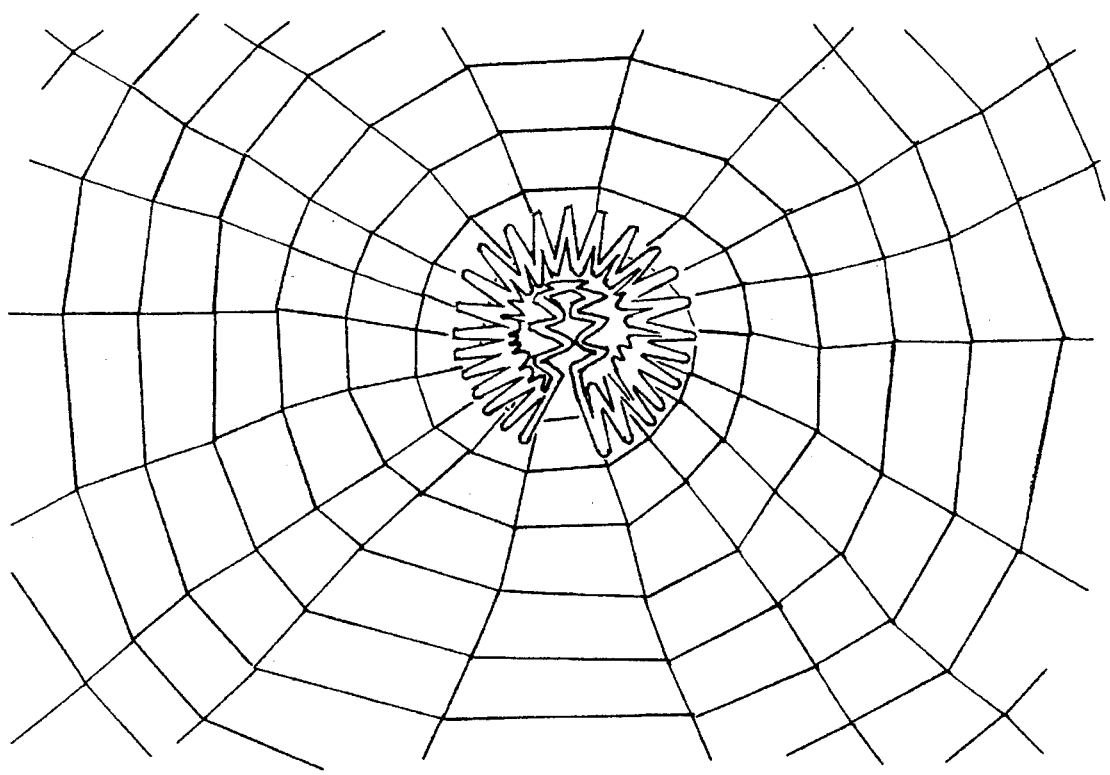
FIG. 2 shows the center portion of a typical orb spider web including a quasi-circular patch style stabilimentum. For scale, the life-size diameter of the stabilimentum should be approximately two inches.

Each of FIG. 1, FIG. 2 and FIG. 3 is a drawing of the center of a large orb web as constructed by a spider common to many parts of the world. The method for carrying out the invention is illustrated in FIG. 4. In a typical application of the invention one would take an image like that of FIG. 1, FIG. 2 or FIG. 3 or an image combining the features of these which would look like the center of a spider web and apply the image to the window. The application of the image to the window might be accomplished, for example, by means of a decal which could be placed on either the inside or the outside of the window.

The decal would be mostly transparent and would therefore not be too obtrusive in interfering with the transparency of the window.

Although the present invention has been described with respect to specific methods for repelling a flying bird from colliding with a transparent barrier by placing on the barrier an image which resembles the center of a spider web, including a stabilimentum, it is not intended that these specific references should place limitations on the scope of the invention. For example, the image placed on the transparent barrier might be nothing more than a stabilimentum with no web. Thus the scope of the invention should be determined by the appended claims and their legal equivalents, rather than by the examples given.

I claim:

1. A passive method of deterring birds from flying toward a window barrier comprising;

providing means for deterring birds from a window barrier comprising a substrate having an image of a spider stabilimentum pattern, and attaching said substrate on said window barrier.

2. The method of claim 1 wherein said image further comprises a pattern of a center portion of a spider web.

3. The method of claim 2 wherein said image further comprises a figure of a spider.

4. The method of claim 1 wherein said substrate is a decal having adhesive means on one surface for facilitating said step of attaching said substrate to said window barrier.

5. A device for deterring birds from colliding with a transparent window barrier, said device comprising;

a means for deterring birds from a transparent window barrier, said means for deterring birds comprising a substrate bearing the image of a spider stabilimentum and a center portion of a spider web, and said substrate having adhesive means on one surface thereof, wherein said substrate is adhesively attached to said transparent window barrier.

6. The device of claim 5 wherein said image further comprises the image of a spider.

7. The device of claim 5 wherein said substrate is a decal having a transparent portion and said image.

8. A device for deterring birds from colliding with a barrier, said device comprising;

a means for deterring birds from said barrier, said means for deterring comprising a decal adhesively attachable to said barrier, and said decal having a transparent portion and an image of a spider stabilimentum.

9. The device of claim 8 wherein said decal further comprises the image of a spider web.

10. The device of claim 8 wherein the decal further comprises the image of a spider.

* * * * *